June 30, 1936.   S. P. MILLER   2,045,608
RECOVERY OF PHENOLS FROM WASTE AND OTHER LIQUORS
Original Filed April 12, 1930   2 Sheets-Sheet 2
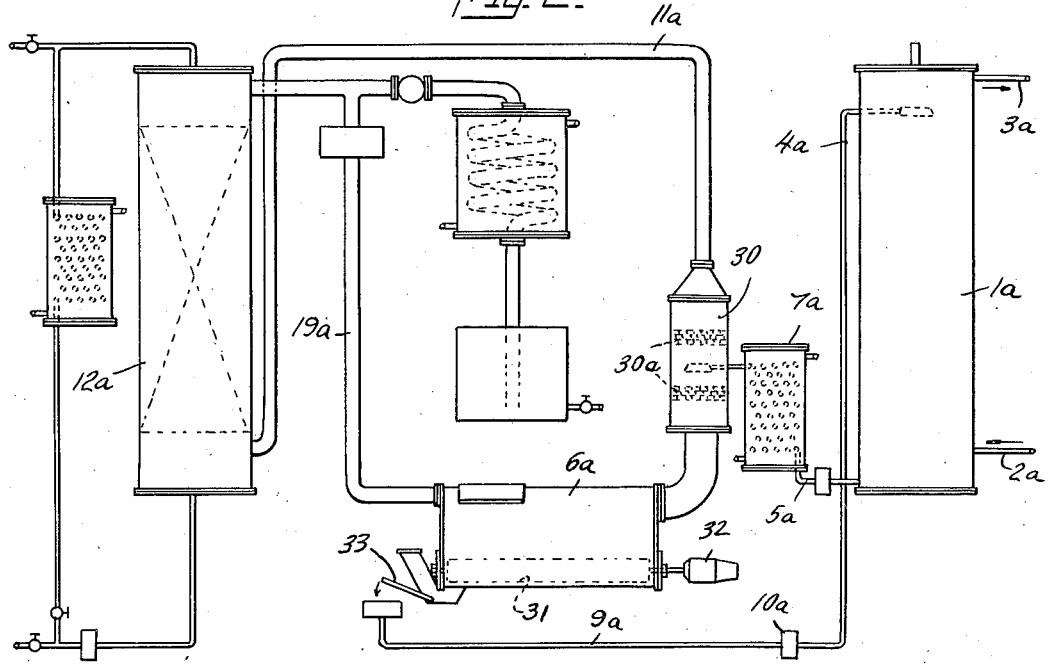
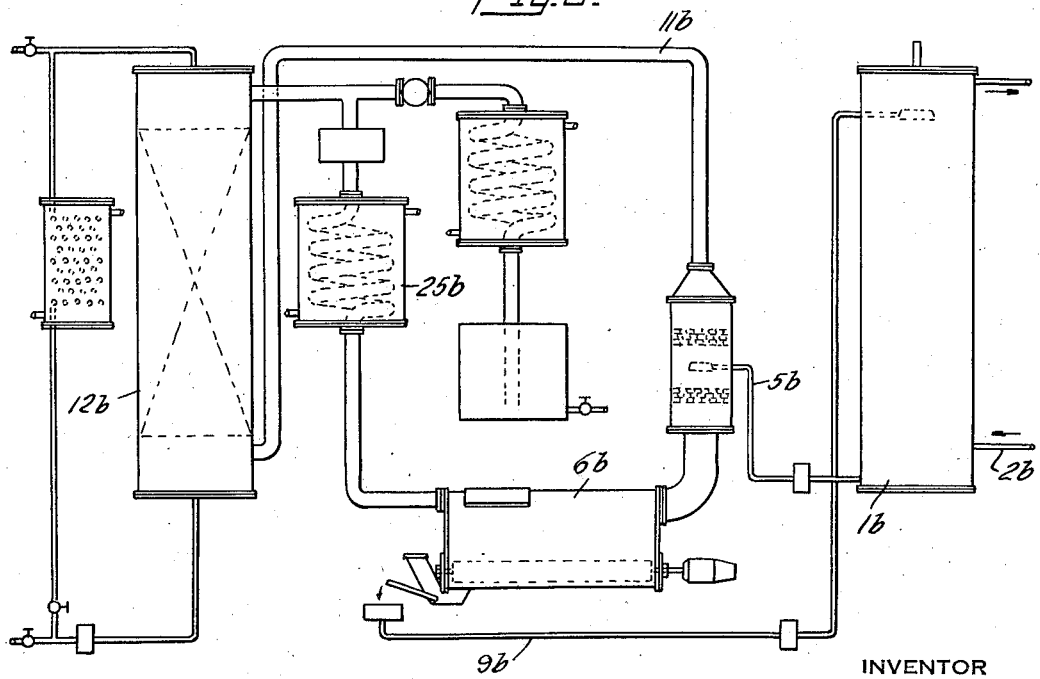
INVENTOR
S. P. Miller
BY
Pennie Davis Marvin & Edmonds
ATTORNEYS Patented June 30, 1936

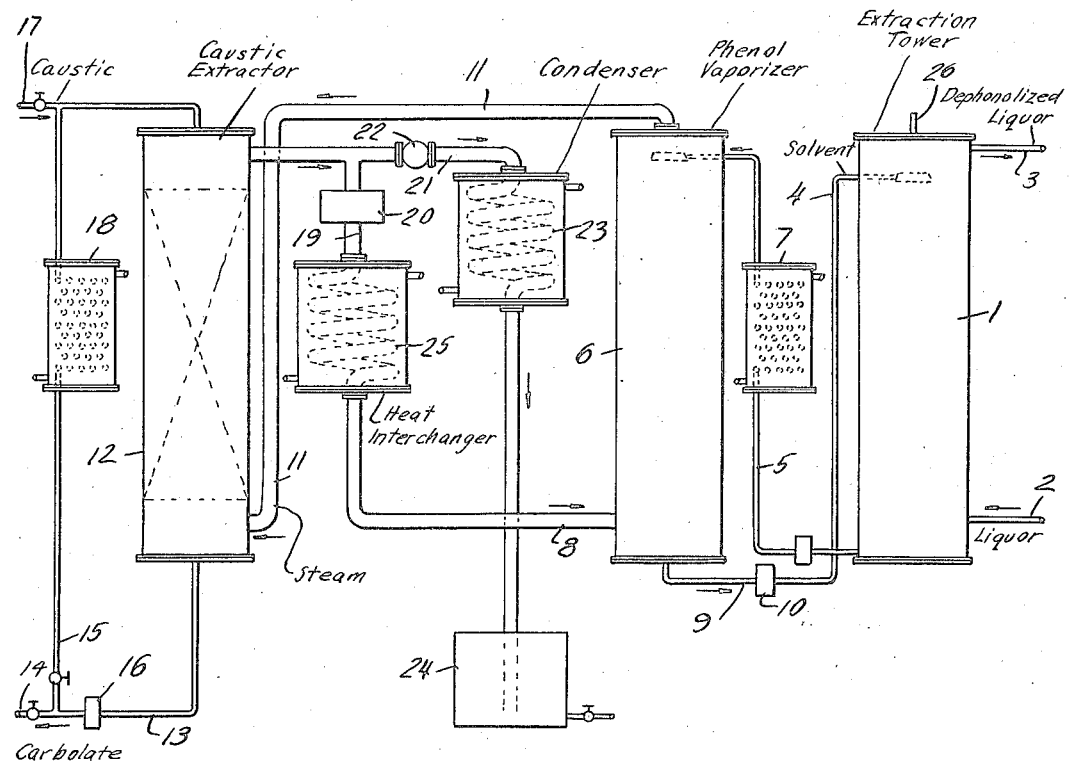

2,045,608

UNITED STATES PATENT OFFICE 2,045,608

RECOVERY OF PHENOLS FROM WASTE AND OTHER LIQUORS

Stuart Parmelee Miller, Scarsdale, N. Y., assignor to The Barrett Company, New York, N. Y., a corporation of New Jersey Application April 12, 1930, Serial No. 443,739
Renewed July 13, 1935

8 Claims. (Cl. 260—154)

This invention relates to the recovery of phenols from waste and other liquors such as weak ammoniacal liquor, etc., by solvent extraction, and includes the recovery of the phenol from the solvent employed. The invention includes both the process and apparatus for carrying it out.

The presence of phenols in waste liquors such as the waste liquor from ammonia stills is objectionable and prevents the disposal of such waste liquors in rivers and other bodies of water, especially those from which drinking water is obtained.

According to this invention the phenols are extracted from the phenol-containing liquor by a solvent, preferably a high boiling solvent, and are then separated from the solvent in a current of steam or other inert gas from which the phenols are subsequently recovered by treatment with caustic.

The solvent employed for the phenol extraction has a specific gravity different from that of the liquor treated. I prefer to use a solvent oil of greater specific gravity than water and in the accompanying drawings apparatus is shown for treatment with such heavy oil. The solvent must be fluid at the temperatures employed and it must be a substance in which tar acids are readily soluble. In order to satisfactorily carry out the process it is preferable to use a solvent which is not readily vaporized by the inert gases under conditions under which the phenols are readily volatilized. For this reason I may advantageously employ a solvent of high boiling point or high boiling range. I prefer to use coal tar distillate with a boiling range above 225° C., for example an oil boiling from about 230° C. to about 375° C. or higher.

In carrying out the process of this invention the solvent for the phenols is brought into direct and intimate contact with the phenol-containing liquor in any suitable manner. This extraction process may advantageously be carried out as a continuous operation, preferably in a tower into the bottom of which the phenol-containing liquor is admitted and into the top of which the solvent is admitted. Baffling means may be provided in the tower to bring the liquor and the solvent which flow countercurrent to one another into intimate contact and expose a large surface of the solvent to the liquor to aid in the removal of phenols.

The resulting solution of phenols in the solvent is drawn off from the tower or other liquor extraction apparatus and the phenols are vaporized from the solution in a current of inert gases. The resulting dephenolized solvent may then be returned to the liquor extraction apparatus for reuse.

The mixture of inert gas and tar acid vapors is extracted with an alkaline reagent such as a caustic solution and any suitable type of extraction apparatus such as a caustic extraction tower is employed for this purpose. Vapor phase extraction which avoids condensation of the steam is desirable as it permits reuse of the steam and saves heat. After the removal of the tar acids the inert gas may advantageously be reused for further volatilization of tar acids from the solution of tar acids in the solvent.

Any moisture which may be present in the solvent as a result of the extraction of the liquor will ordinary be volatilized in the inert gas employed for the distillation of the tar acids and means is therefore provided for gradually and continuously withdrawing a small portion of the recirculated inert gas so as to maintain the pressure in the extraction system constant. Although any inert gas may be used in starting up the process, after some little time it will be chiefly or entirely replaced by vapors of neutral oils and steam resulting from the vaporization of water and oils present in the solvent.

While it is advantageous to use a high boiling solvent containing a relatively small amount of volatile constituents, it is not necessary to do so for the successful operation of this process. If a solvent is used containing constituents having a substantial vapor pressure at the temperature of operation, the circulated steam or other inert gas will contain a substantial amount of the vapors of these constituents. The greater the amount of volatile constituents in the solvent and the higher their partial pressures, the greater will be the proportion of their vapors in the recirculated steam. Since, however, these vapors will be absorbed in the caustic solution to a very much smaller extent than the phenols (e. g. in some cases in a ratio of 1 part oil to 10 parts of phenols), a large portion of them will be returned to the dephenolizing tower or other apparatus. When this stream of vapors, free of tar acids but containing considerable oil vapors, comes in contact with the tar-acid-laden solvent, a selective vaporization of tar acids will occur, the vaporization of other volatile oils from the solvent being repressed by the presence of their vapors already in the vapor stream.

When the process is operated at a relatively high temperature, a bleed-off may be provided in the vapor line to permit operation of the system at atmospheric pressure. It is then advantageous to condense the vapors bled off and recover the neutral oils contained in them.

The heat necessary for volatilizing the tar acids from the solvent may be supplied to the solvent alone before it enters the phenol vaporizing apparatus, or to the inert gas after it leaves the caustic extraction apparatus and before it enters the phenol vaporizing apparatus. Both the solvent and the inert gas may be heated to some extent or either one may be heated alone as desired. Heat may also be supplied to the caustic-carbolate solution, either in the caustic supply tank or in the caustic extraction tower, thus facilitating the production of concentrated carbolate.

Satisfactory results may be obtained without heating the inert gas, by heating the solvent and dissolved phenols to a temperature of, for example, 120–150° C. or higher, before it enters the phenol vaporizing apparatus. The heat of vaporization of the phenols may thus be supplied by the heat of the solvent and phenols themselves. The temperature of the solvent will be reduced by the loss of this heat of vaporization and heat will be absorbed by the relatively cooler inert gas. This reduction in temperature may be considerable and it is ordinarily desirable that the temperature of the solvent be reduced before it is again brought into contact with the liquor.

As an alternative method, the heat of vaporization of the phenols may be supplied by the inert gas. In this case the inert gases brought in contact with the solution of phenols in the solvent will heat the solution and the phenols will then be distilled by the heat of these gases. The mixture of inert gases and tar vapors drawn off from the phenol vaporization apparatus will be treated with caustic solution for the removal of the tar acids and the resulting inert gases will then be again heated for reuse.

Any suitable high boiling phenol solvent which is immiscible with the liquor being extracted may be employed in carrying out the process. Although I prefer to use coal tar distillate of high boiling range, petroleum distillate of sufficiently high boiling range may be employed, or a pure chemical compound, liquid at the temperatures employed and of high boiling point may be used.

Although my process is more particularly designed for the extraction of phenols from waste gas liquors, it may be employed for extracting phenols from the waste liquors of tar plants, tar acid refining plants, etc.

Any suitable apparatus such as three separate towers may be employed for the tar acid extraction, phenol vaporization and caustic extraction. Instead of a tower, a spray roll box may be employed for the phenol vaporization.

The invention is further illustrated in a more or less diagrammatic manner in the accompanying drawings, but it is intended and is to be understood that it is not limited thereto.

Fig. 1 is an elevation of apparatus in which means is provided for heating both the solvent used and for the phenol extraction and the inert gas used for the phenol vaporization;

Fig. 2 is a modified form of apparatus in which means is provided for heating the solvent only; and Fig. 3 is a further modification provided with means for heating only the inert gas.

The liquor to be extracted enters the extraction tower 1 thru the pipe 2. It passes up thru the extraction tower countercurrent to the solvent and is drawn off thru the pipe 3 in a substantially phenol-free condition. The extraction tower may be equipped with baffles or other means for bringing a large surface of the liquor and solvent into contact. The extracted liquor which flows off thru the pipe 3 may be run to waste in sewers or streams, etc. without danger of phenol-contamination.

In this example coal tar distillate with a boiling range of about 230–375° C. or higher is employed as the solvent. This oil has a specific gravity greater than water. It enters the extraction tower thru the pipe 4 at the top of the tower and is drawn off at the bottom thru the pipe 5. It passes countercurrent to the liquor in the tower and extracts the tar acids from the liquor. The solution of tar acids or phenols in the solvent is drawn off from the extraction tower thru the pipe 5 to the phenol vaporizer 6. Heat is supplied to the solution in the heat interchanger 7 to aid in the distillation of the tar acids. Only a part of the heat required for the distillation is supplied to the solution in this heater 7. Heat may be supplied from any convenient source, as for example, from waste flue gases, from steam coils, from oil burners, etc.

In the phenol vaporizer 6 phenols are vaporized from the solvent in a current of steam and oil vapors which enters the bottom of the vaporizer thru the pipe 8. The solvent is sprayed into the current of steam which rises up thru the vaporizer and the phenols are volatilized. The dephenolized solvent which remains is drawn off from the bottom of the vaporizer thru the line 9 and pumped by the pump 10 back into the extraction tower 1 thru the line 4.

The mixture of steam and tar acid vapors passes off from the vaporizer thru the line 11 to the caustic extractor 12. In this caustic extractor the mixture of steam and tar acid vapors is sprayed with caustic. The temperature and concentration of the caustic is advantageously so regulated that there is little or no cooling of the steam in the caustic extractor and a concentrated carbolate solution is produced. The caustic may be supplied continuously at 17, a portion being preferably but not necessarily recirculated from the bottom of the extractor thru the line 13, pump 16 and line 15, and the balance being drawn off thru the line 14 to storage or, if desired, to be treated with acid to recover the phenols. A heat interchanger 18 may be provided in the line 15 for regulating the temperature of the recirculated portion as desired. The caustic absorption may also be operated batchwise, with or without recirculation.

The steam, after removal of the tar acid vapors, is recirculated thru the lines 19 and 8 to the phenol vaporizer. Any water which is carried over from the extraction tower 1 into the vaporizer 6 by the solvent and there volatilized is added to the steam which is recirculated thru the caustic extractor and the phenol vaporizer. Unless this added steam is condensed in the caustic extractor (which is usually not desirable), a part of the vapors must be bled off, as for example from the line 19 ahead of the blower 20, and a pipe 21 with a suitable regulating valve 22 may be provided for this purpose. The pipe 21 passes thru the condenser 23 where any vapors carried in the steam are condensed together with the steam. The water and oils are collected in the decanter 24 from which they may be separately collected. The oils are advantageously returned to the extraction tower 1 where the solvent is recovered.

A heater 25 may be provided in the steam return line 19 to supply to the steam a portion of the heat required for volatilization of the phenols. The heat necessary for this volatilization is supplied in part by the heater 25 and in part by the heater 7.

The extraction tower 1 is advantageously equipped with a vent 26 to maintain the extraction tower under atmospheric pressure.

The liquor which enters at 2 should be at such a temperature that good separation of the liquor from the extracting oil will be obtained. The liquor may be heated if desired.

Fig. 2 shows apparatus in which a spray type of vaporizer is employed for spraying the solution of solvent and phenol into the steam. The vaporizer is shown at 6a. The liquor enters the extraction tower 1a thru the line 2a and leaves thru the line 3a. The solvent enters the extraction tower thru the line 4a and is drawn off at the bottom thru the line 5a. It is heated in the heat interchanger 7a to a temperature of 120–150° C. It is sprayed into the settling tower 30 thru which the inert gases and tar acid vapors leave the vaporizer 6a. Baffle means 30a are provided above and below the spray to remove entrained particles of spray from the gases and to expose a large surface of the solution of solvent and tar acids to the action of the steam and vapors leaving the vaporizer. Partial volatilization of the tar acids takes place in the settling tower 30 and the solvent then runs down into the vaporizer 6a.

In this vaporizer is a roll 31 which is rotated at high speed by the motor 32. By regulating the position of the draw-off arm 33 the depth of liquid maintained in the vaporizer can be controlled and the draw-off arm is so adjusted that the roll 31 dips to but a slight extent into the liquid in the bottom of the vaporizer. By rapid rotation of the roll 31, for example 900–1200 R. P. M., an intense spray of the hot solution is thrown into the steam and the tar acids are volatilized. The dephenolized solvent is drawn off thru the pipe 9a and returned by the pump 10a to the extraction tower. The steam and tar acid vapors pass off from the settling tower 30 thru the line 11—a into the caustic extractor 12—a where they are sprayed with caustic and the tar acids are recovered as carbolate.

In Fig. 3 the liquor which enters the extraction tower 1—b thru the line 2—b is extracted with solvent, and tar acids are volatilized from the solution of solvent and tar acids in the vaporizer 6—b. The dephenolized solvent is returned to the extraction tower thru the line 9b and the mixture of steam and tar acid vapors pass off from the vaporizer thru the line 11—b into the caustic extractor 12—b. Here the tar acids are removed from the steam. The steam then passes thru the heater 25—b where it is raised to such a temperature that it contains sufficient heat to volatilize the tar acids present in the solvent as it enters the vaporizer 6b. The hot gases and the solution of solvent and tar acids pass thru the vaporizer in a countercurrent direction. The hot inert gases volatilize the constituents of higher vapor pressure from the solution of solvent and tar acids, including the tar acids. The dephenolized solvent is returned to the extraction tower and the steam and tar acid vapors pass to the caustic extractor for the formation of carbolate from which tar acids are subsequently recovered.

Regardless of the manner of producing the carbolate as here described, the tar acids may be recovered by acidifying the carbolate in any suitable manner, for example by combustion gases or other gases containing carbon dioxide. The tar acids thus recovered may be purified and separated into their various components as by distillation, etc.

I claim:

1. The method of recovering phenols from phenol-containing liquors, which comprises extracting the liquor with a coal tar oil by bringing the liquor and oil into intimate contact, separating the dephenolized liquor and the oil, volatilizing the phenols from the oil in a current of inert gas, bringing the dephenolized oil into intimate contact with further amounts of phenol-containing liquor, separating phenol vapors from admixture with the inert gas by bringing the mixture of phenols and inert gas into contact with caustic, and returning the dephenolized inert gas for further vaporization of phenols.

2. The method of recovering phenols from waste liquors, which comprises bringing coal tar distillate boiling above 230° C. into direct contact with the liquor to effect extraction of the phenols therefrom, bringing the resulting solution of distillate and phenols into direct and intimate contact with a current of hot inert gas whereby the phenols are volatilized, separating the phenols from the inert gas by direct contact with caustic, heating the resulting dephenolized inert gas and employing the gas for further volatilization of phenols from distillate which has been employed for phenol extraction.

3. The method of recovering phenols from waste liquors, which comprises extracting the phenols therefrom with coal tar distillate with a boiling range above 225° C., heating the resulting solution of phenols in the distillate to a temperature of at least 120° C., separating the phenols from the distillate by volatilization in a current of steam, reusing the dephenolized distillate for phenol extraction, recovering phenols from the steam by contact with caustic, and reusing the steam for distillation of further distillate.

4. The method of recovering phenols from waste liquors, which comprises extracting the phenols therefrom with coal tar distillate with a boiling range above 225° C., heating the resulting solution of phenols in distillate to a temperature of at least 120° C., spraying the heated solution into a current of steam to volatilize the phenols, spraying the resulting mixture of phenols and steam with caustic to form carbolates, reusing the dephenolized distillate for further liquor extraction and reusing the steam for further phenol volatilization.

5. The method of extracting phenols from phenol-containing liquors with a liquid solvent which is immiscible with water and has a specific gravity greater than water, which comprises heating the solvent, bringing the hot solvent into contact with hot phenol-containing liquor to extract phenols therefrom, subjecting the resulting solvent to distillation with an inert gas to distill phenols therefrom thereby making the solvent available for further extraction of phenol-containing liquor, recovering tar acids from the resulting vapors by direct contact with an alkaline reagent without effecting substantial condensation of the vapors, recycling the resulting inert gas and reusing the solvent after this dephenolization for further extraction of tar acids from the phenol-containing liquor.

6. The method of recovering phenols from phenol-containing liquors, which comprises extracting phenols from the liquors by bringing them into contact with a solvent oil, separating the phenols from the oil by volatilization in a current of inert gas, treating the gas with an alkaline reagent at a temperature above the dewpoint of the mixture of inert gas and solvent vaporized in the aforesaid extraction of the liquors so as to separate the phenols from the inert gas, returning the resulting gas for further use in the volatilization of phenols and reusing the solvent in the extraction of the liquors.

7. The method of recovering phenols from phenol-containing liquors, which comprises extracting phenols from the liquor with a solvent oil by bringing the liquor and oil into intimate contact, separating the dephonolized liquor and the oil, volatilizing the phenols from the oil in a current of inert gas, bringing the dephenolized oil into intimate contact with further amounts of phenol-containing liquor, separating phenol vapors from admixture with the inert gas by bringing the mixture of phenols and inert gas into contact with caustic, and returning the dephenolized inert gas for further vaporization of phenols.

8. The method of recovering phenols from phenol-containing liquors, which comprises extracting phenols from the liquor with a solvent oil by bringing the liquor and oil into intimate contact, separating the dephenolized liquor and the oil, volatilizing the phenols from the oil in a current of inert gas, bringing the dephenolized oil into intimate contact with further amounts of phenol-containing liquor, separating phenol vapors from admixture with the inert gas by bringing the mixture of phenols and inert gas into contact with caustic, returning the dephenolized inert gas for further vaporization of phenols and bleeding from the system in which the inert gas is circulated for the dephenolization of the oil and separation of phenol vapors from the inert gas, a portion of the inert gas sufficient in amount to maintain the system at about atmospheric pressure.

S. P. MILLER.